United States Patent
Marshall et al.

(10) Patent No.: US 10,472,098 B2
(45) Date of Patent: Nov. 12, 2019

(54) MASS EFFICIENT REACTION WHEEL ASSEMBLY SYSTEMS INCLUDING MULTI-FACETED BRACKET STRUCTURES

(71) Applicant: HONEYWELL INTERNATIONAL INC., Morris Plains, NJ (US)

(72) Inventors: Terence Marshall, Glendale, AZ (US); Thom Kreider, Peoria, AZ (US); Paul Buchele, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 477 days.

(21) Appl. No.: 15/333,664

(22) Filed: Oct. 25, 2016

(65) Prior Publication Data

US 2018/0111705 A1   Apr. 26, 2018

(51) Int. Cl.
  *B64G 1/28* (2006.01)
  *G01C 21/16* (2006.01)
(52) U.S. Cl.
  CPC .............. *B64G 1/283* (2013.01); *B64G 1/285* (2013.01); *G01C 21/16* (2013.01)
(58) Field of Classification Search
  CPC ......... B64G 1/283; B64G 1/285; G01C 21/16
  See application file for complete search history.

(56) References Cited

U.S. PATENT DOCUMENTS

| | | |
|---|---|---|
| 4,711,125 A | 12/1987 | Morrison |
| 5,363,700 A | 11/1994 | Joly et al. |
| 5,793,116 A | 8/1998 | Rinne et al. |
| 6,412,346 B2 * | 7/2002 | Barkai .................. G01C 21/16 73/493 |

(Continued)

FOREIGN PATENT DOCUMENTS

| | | |
|---|---|---|
| DE | 4136355 A1 | 5/1993 |
| EP | 0669251 A2 | 12/1994 |

(Continued)

OTHER PUBLICATIONS

Extended EP Search Report for Application No. 17197660.8 dated Mar. 21, 2018.

*Primary Examiner* — Philip J Bonzell
*Assistant Examiner* — Tye William Abell
(74) *Attorney, Agent, or Firm* — Lorenz & Kopf, LLP

(57) ABSTRACT

Embodiments of Reaction Wheel Assembly (RWA) systems are provided, which include multi-faceted bracket structures to which RWAs are mounted. In one embodiment, the RWA system includes a bracket structure, which is assembled from multiple (e.g., two to four) interchangeable panels. Each bracket panel may define or include a mount bracket to which an RWA is mounted. In certain embodiments, the bracket panels may include integral bearing cartridge features, which contain the spin bearings of the RWAs. The interchangeable panels may have interconnect features, which align and which possibly interlock to position the panels in a precise angular relationship when the multi-faceted bracket structure is assembled. In other embodiments wherein the bracket structure is assembled from two interchangeable panels or produced as a single piece, the multi-faceted bracket structure may have a peaked form factor supportive of two RWAs, which are mounted to the bracket structure in a back-to-back relationship.

16 Claims, 8 Drawing Sheets

(56) References Cited

U.S. PATENT DOCUMENTS

| | | | |
|---|---|---|---|
| 6,515,221 B1* | 2/2003 | Varga | B64G 1/283 |
| | | | 174/384 |
| 6,918,297 B2 | 7/2005 | MacGugan | |
| 7,370,530 B2 | 5/2008 | DCamp et al. | |
| 7,814,791 B2* | 10/2010 | Andersson | G01P 15/18 |
| | | | 73/504.02 |
| 8,037,754 B2 | 10/2011 | Eriksen et al. | |
| 8,234,943 B2* | 8/2012 | Peng | G02B 26/001 |
| | | | 74/5.22 |
| 9,213,046 B2 | 12/2015 | Wang | |
| 2010/0006705 A1* | 1/2010 | Faucheux | B64G 1/286 |
| | | | 244/165 |
| 2016/0010991 A1* | 1/2016 | Marshall | B64G 1/283 |
| | | | 74/5.37 |

FOREIGN PATENT DOCUMENTS

| | | |
|---|---|---|
| EP | 2965995 A1 | 1/2016 |
| FR | 2907423 A1 | 4/2008 |

* cited by examiner

MASS EFFICIENT REACTION WHEEL ASSEMBLY SYSTEMS INCLUDING MULTI-FACETED BRACKET STRUCTURES

TECHNICAL FIELD

The present disclosure relates generally to attitude adjustment systems and, more particularly, to reaction wheel assembly systems including multi-faceted bracket structures, which have high mass efficiencies, modular constructions, and/or other useful features.

BACKGROUND

Reaction Wheel Assemblies (RWAs) are routinely deployed onboard satellites and other vehicles for attitude adjustment purposes. By common design, an RWA contains a rotor having a rotor shaft, which is fixedly joined to an inertial element (e.g., an outer rim or ring) by a suspension web. The rotor may be mounted within a housing assembly having upper and lower halves, which are sealingly joined to enclose the rotor. The opposing ends of the rotor shaft are received within cylindrical cavities or bores provided in the RWA housing assembly. Spin bearings, such as duplex pair ball bearings, are positioned around the opposing shaft ends to provide a rotor suspension, which generally limits freedom of rotor motion relative to the housing assembly in all directions except for rotation about a spin axis. During RWA operation, a spin motor drives rotation of the rotor about the spin axis at a relatively high rate of speed to create momentum. When it is desired to adjust the attitude of the host vehicle, control circuitry commands the spin motor to alter the rotational speed of the rotor and, therefore, the momentum of the inertial element. Due to this momentum change, a controlled output torque is generated and transferred from the RWA to the host vehicle to effectuate the desired attitude adjustment. Three or more RWAs can be combined with mounting hardware to produce an RWA system capable of performing highly controlled attitude adjustments about orthogonal axes in three dimensional space.

As satellites increase in number and decrease in size, a demand has arisen for increasingly compact, lightweight, relatively low cost, and readily manufacturable RWAs adapted for deployment onboard so-called "small satellites" or, more simply, "smallsats." Although a universal definition is yet to be established, a satellite weighing less than 400 kilograms is often considered a "small satellite." Small satellites include, for example, miniaturized cube-shaped research and communication satellites commonly referred to as "cubesats." As the demand for small scale RWAs has increased, so too has the demand for RWA systems similarly characterized by relatively compact form factors and high mass efficiencies. Such RWA systems are desirably not only highly mass efficient, but are also ideally manufacturable at competitive costs and capable of prolonged, failure free, spaceborne operation comparable to that traditionally provided by legacy RWA systems. Embodiments of RWA systems having such desirable attributes are disclosed herein. Additionally, in certain embodiments, the below-described RWA systems feature highly modular designs, which allow enhanced flexibility in satellite mounting solutions and streamlined RWA maintenance.

BRIEF SUMMARY

Embodiments of mass efficient Reaction Wheel Assembly (RWA) systems are provided. In one embodiment, the RWA system includes a bracket structure assembled from multiple (e.g., two to four) interchangeable panels. The interchangeable panels may each include an RWA support-face in which a mount bracket is formed. The mount bracket serves a mechanical plant supporting components of a corresponding RWA, such as control electronics, a rotor, a spin motor, one or more spin bearings, and the like. The interchangeable panels may have mating interconnect features, which align and may structurally interlock to precisely locate the panels in a predetermined angular relationship when the multi-faceted bracket structure is fully assembled. The interchangeable panels may further include integral bearing cartridge features, which house the spin bearings of the RWAs. In certain implementations, three to four interchangeable panels are assembled to yield a generally pyramidal multi-faceted bracket structure. In other cases, two interchangeable panels may be assembled in a back-to-back relationship to yield a bi-faceted bracket structure having a generally peaked form factor. Still further embodiments of the multi-faceted bracket structure may have such a peaked form factor, while being produced as a single piece or monolithic body composed of a lightweight, high strength material, such as a beryllium-aluminum alloy.

In further implementations, the RWA system includes a multi-faceted bracket structure having a centerline. Multiple RWA-support faces are angularly spaced about the centerline at, for example, substantially regular intervals. The RWA system further includes a vehicle mount interface oriented substantially orthogonal to the centerline. A plurality of RWAs is mounted to the RWA-support faces of the multi-faceted bracket structure. The multi-faceted bracket structure is assembled from multiple interchangeable panels, each of which defines one of the RWA-support faces and a portion of the vehicle mount interface. For example, the multi-faceted bracket structure may be assembled from n number of the multiple interchangeable panels, and wherein 2<n>5. In certain embodiments, the interchangeable panels may include mount brackets formed in the RWA-support faces, and the RWAs may include a plurality of rotors mounted to the mount brackets for rotation about a plurality of spin axes. The RWAs may further include a plurality of spin bearings, such as duplex pair rolling element bearings, which are housed by bearing cartridge features integrally formed with the mount brackets of the interchangeable panels.

In still further embodiments, the RWA system includes a multi-faceted bracket structure, which is assembled from first and second interchangeable panels. The RWA system may further include a vehicle (e.g., satellite) mount interface, which is at least partially defined by the first and second interchangeable panels. The first and second interchangeable panels may define or include first and second mount brackets, respectively, to which first and second RWAs are mounted. In certain embodiments, the first interchangeable panel may further include or define an RWA-support face in which an opening is formed, and the first mount bracket may include: (i) a plurality of cross-beams extending radially within the opening, and (ii) a central hub portion integrally formed with the plurality of cross-beams and substantially concentrically located within the opening. The first mount bracket may also include a bearing cartridge feature, which contains at least one spin bearing included in the first RWA and which is integrally formed within the central hub portion.

In yet further embodiments, the RWA system includes a multi-faceted bracket structure, a first RWA, and a second RWA. The multi-faceted bracket structure includes, in turn, a first bracket structure portion defining a first mount bracket, as well as a second bracket structure portion defining a second mount bracket. The first and second bracket structure portions are opposed about a midline plane containing a centerline of the multi-faceted bracket structure. The first and second RWAs are mounted to the first and second mount brackets, respectively. In embodiments of the RWA system, the first and second bracket structure portions are integrally formed (e.g., cast and machined) as a single piece or monolithic structure. In other embodiments, the first and second bracket structure portions are produced as discrete pieces, which are assembled and secured in a back-to-back relationship relative to the midline plane.

BRIEF DESCRIPTION OF THE DRAWINGS

At least one example of the present disclosure will hereinafter be described in conjunction with the following figures, wherein like numerals denote like elements, and.

DETAILED DESCRIPTION

Figure 1:
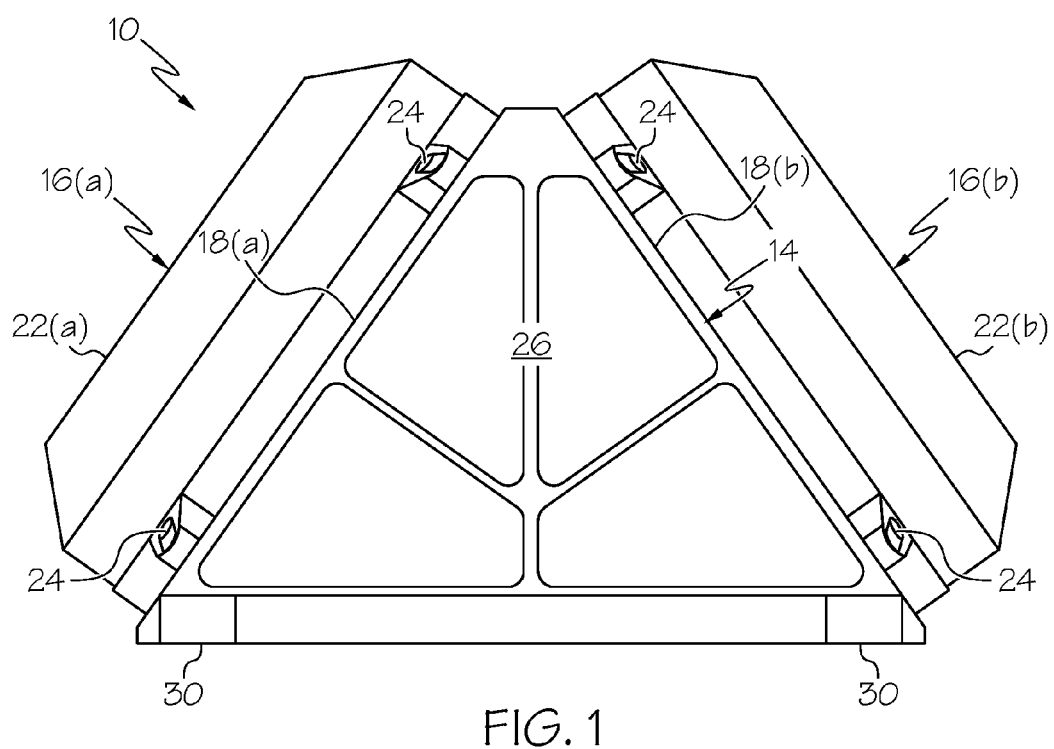
FIGS. 1, 2, and 3 are side, partially assembled isometric, and partially assembled cross-sectional views, respectively, of a Reaction Wheel Assembly (RWA) system including a bi-faceted, monolithic bracket structure, as illustrated in accordance with a first exemplary embodiment of the present disclosure.

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. Furthermore, terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements.

The following describes embodiments of a Reaction Wheel Assembly (RWA) system, which can be deployed onboard a spacecraft (e.g., a satellite) or other vehicle for attitude adjustment purposes. The RWA system includes a number of RWAs, which are mounted to a common chassis or base structure referred to herein as a "multi-faceted bracket structure." In certain embodiments, the multi-faceted bracket structure is assembled from multiple mating pieces, which are freely interchangeable or swappable and referred to as "interchangeable panels." The interchangeable panels may each include an RWA mount interface or "mount bracket," which serves as a mechanical plant supporting multiple components included within the RWA mounted to the panel. The interchangeable panels may also include mating or interlocking structural features, which register or locate adjoining panels (and, thus, the relative orientation of the RWA spin axes) in a predetermined spatial relationship within the bracket assembly. Such a modular design may reduce the manufacturing costs of the RWA system and streamline RWA system maintenance. Additionally, embodiments of the RWA system may be characterized by relatively low part counts, decreased assembly times, and reduced manufacturing costs due, at least in part, to the integration of certain features (e.g., bearing cartridge features) into the mount brackets of the multi-faceted bracket structure.

In certain implementations, the RWA system may contain three to four RWAs and an equivalent number of interchangeable panels, which are assembled into a multi-faceted bracket structure. In this case, the multi-faceted bracket structure may assume the form of a generally pyramidal assemblage including three to four principal faces or angled sides. In other implementations, the RWA system may contain two RWAs supported by two interchangeable panels. In this latter case, the interchangeable panels may be positioned in an opposing, back-to-back relationship to produce a bi-faceted bracket structure having a generally peaked geometry. By imparting the bracket structure with such a bi-faceted, peaked form factor, the overall mass efficiency of the RWA system can be optimized. As a further benefit, such a peaked bracket structure may provide relatively comprehensive radiation shielding of electronic components housed within an internal compartment provided in the bracket structure. In still further embodiments, the RWA system can contain a bi-faceted, peaked bracket structure, while the bracket structure is produced as a single piece for reduced part count and enhanced structural integrity. In such embodiments, and regardless of whether the bi-faceted bracket structure is fabricated as a single piece or assembled from multiple interchangeable panels, the resulting RWA system may be mounted to a satellite (or other vehicle) along with a second, substantially identical RWA system to enable controlled attitude adjustments of the vehicle about orthogonal axes in three dimensional space. A first exemplary embodiment of an RWA system including such a bi-faceted bracket structure will now be described in conjunction with FIGS. 1-3.

Figure 2:
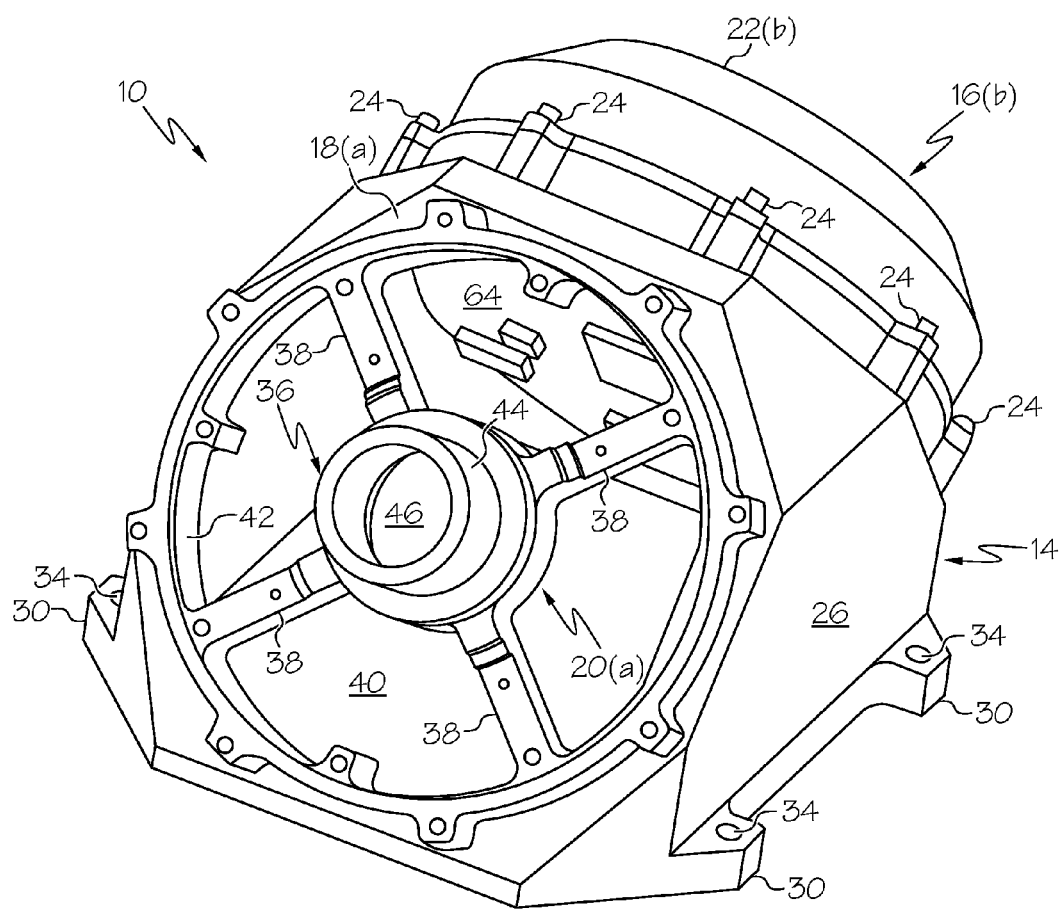
Figure 3:
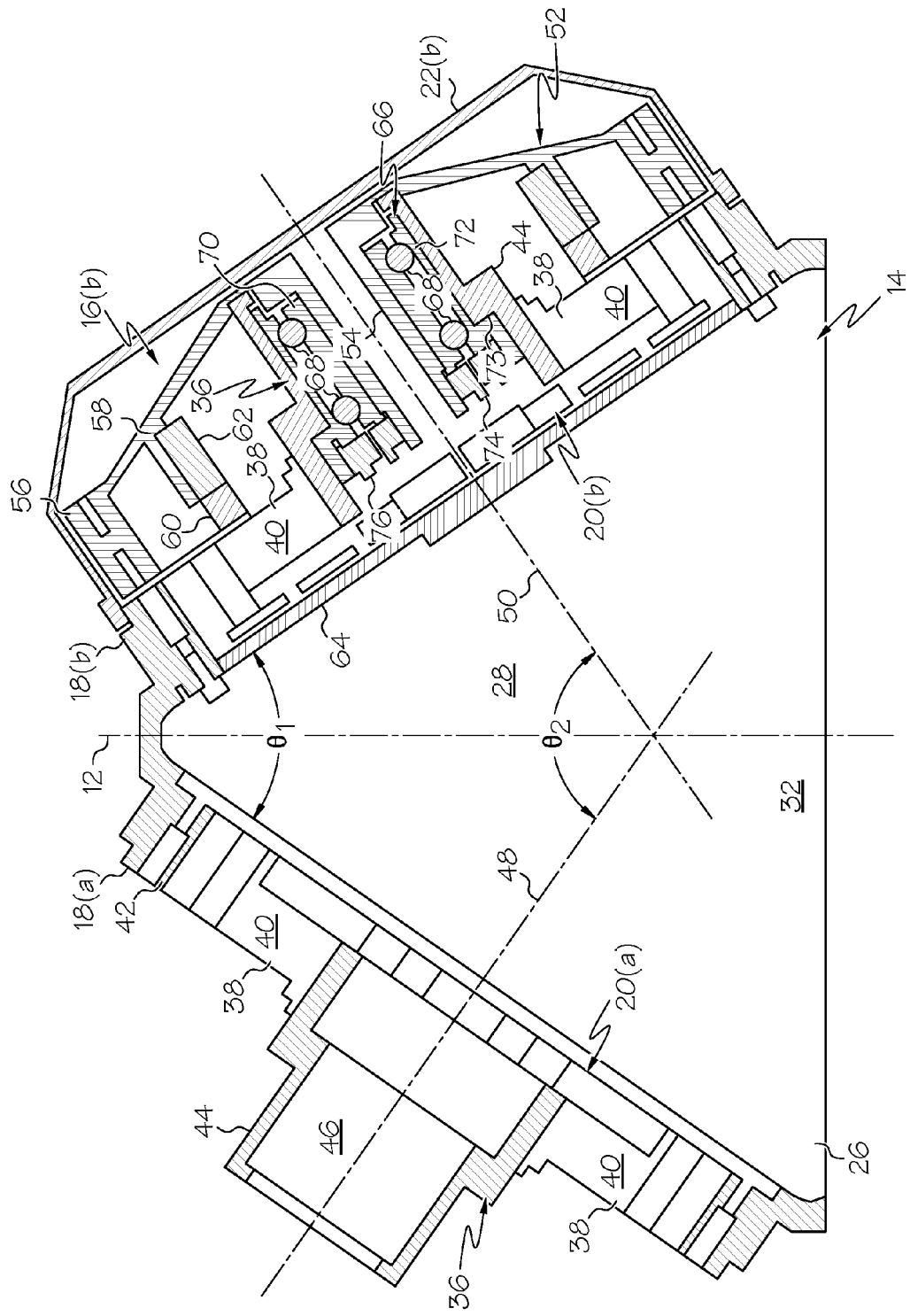

FIGS. 1, 2, and 3 are side, partially assembled isometric, and cross-sectional side views, respectively, of an RWA system 10 having a centerline 12 (FIG. 3), as illustrated in accordance with an exemplary embodiment of the present disclosure. RWA system 10 includes a multi-faceted bracket structure 14 and a number of RWAs 16, which are mounted to bracket structure 14 at different locations. In certain embodiments, RWA system 10 may include three or four RWAs 16 positioned in an array angularly spaced about centerline 12. In the exemplary embodiment shown in FIGS. 1-3, RWA system 10 includes two RWAs 16(a), 16(b), which are opposed about a midline plane of symmetry (containing centerline 12 and orthogonal to the plane of the page in FIG. 3). Multi-faceted bracket structure 14 is thus produced as a bi-faceted body in the illustrated embodiment and includes two opposing, angled RWA-support faces 18(a), 18(b) to which RWAs 16(a), 16(b) are mounted, as described more fully below. Similarly, two rotor covers 22(a), 22(b) are attached to RWA-support faces 18(a), 18(b) and enclose RWAs 16(a), 16(b), respectively. Rotor covers 22(a), 22(b) can be joined to RWA-support faces 18(a), 18(b), respectively, utilizing a plurality of bolts 24 or other fasteners. A hermetic or near hermetic seal may be formed when rotor covers 22(a), 22(b) are joined to multi-faceted bracket structure 14 in this manner. Alternatively, hermetic seals may not be formed between rotor covers 22(a), 22(b) and bracket structure 14, or RWA system 10 may lack rotor covers in further embodiments.

In addition to RWA-support faces 18(a), 18(b), multi-faceted bracket structure 14 includes a main body 26 containing an internal compartment or cavity 28. Internal cavity 28 is physically accessible through a lower opening 32 (FIG. 3) provided in body 26. Internal cavity 28 can accommodate one or more electronic components of RWA system 10 including, for example, control circuitry supporting operation of RWAs 16. When multi-faceted bracket structure 14 is mounted to a satellite or other host vehicle, internal cavity 28 may be enclosed and lower opening 32 covered by a wall of the vehicle. A vehicle mount interface 30 is provided around a lower perimeter of body 26 to facilitate attachment of multi-faceted bracket structure 14 to such a host vehicle. Vehicle mount interface 30 is substantially orthogonal to centerline 12 (FIG. 3) in the illustrated example and includes a number of tabs in which fastener openings 34 are formed. Vehicle mount interface 30 thus facilitates attachment of RWA system 10 to a corresponding host vehicle mount interface utilizing fasteners. Vehicle mount interface 30 may differ from the illustrated example in further embodiments. As RWA system 10 contains only twin RWAs 16 in the illustrated example, two RWA systems 10 may be mounted to the host vehicle at different locations to enable controlled attitude adjustments about orthogonal axes.

A mount bracket 20(a) is included or formed in RWA-support face 18(a). When RWA system 10 is fully assembled, mount bracket 20(a) supports the various components of RWA 16(a), which may include a rotor, a spin motor, control electronics, one or more spin bearings, and various other components. Similarly, a substantially identical mount bracket 20(b) is likewise formed in RWA-support face 20(b) to provide a platform for installation of the components included in RWA 16(b). As shown most clearly in FIG. 2 for mount bracket 20(a), mount brackets 20(a), 20(b) each include a central hub portion 36 and a plurality of radially-extending features 38 (referred to herein as "tie bars" or "cross-beams 38"). A relatively large, generally circular opening 40 is further provided in a central portion of RWA-support face 18(a) such that an inner circumferential edge 42 of mount bracket 20(a) borders or circumscribes opening 40. Cross-beams 38 extend from circumferential edge 42 in a radially inward direction to connect to hub portion 36. Cross-beams 38 thus effectively suspend hub portion 36 of each mount bracket 20(a), 20(b) concentrically within its respective opening 40.

Mount brackets 20(a), 20(b) may include any number and type of structural features facilitating the attachment of the RWA components thereto. For example, as indicated in FIG. 3 for mount bracket 20(a), a number of fastener openings may be formed in cross-beams 38. The fastener openings may facilitate attachment of control electronics, such as Printed Board Assembly (PBA), to the interior of mount bracket 20(a). Additionally or alternatively, such fastener openings may aid in the attachment of a spin motor to the exterior of mount bracket 20(a) substantially opposite the PBA. Although hidden from view in FIGS. 1-3, it will be appreciated that cross-beams 38 of mount bracket 20(a) may also include similar fastener openings or other mount features. Finally, as described more fully below, central hub portion 36 of mount brackets 20(a), 20(b) may rotatably support the respective rotors of RWAs 16(a), 16(b) by, for example, containing spin bearings included within RWAs 16(a), 16(b). Cross-beams 38 may be tuned (e.g., by dimensional adjustments) to shift the critical modes of RWA 16(a) toward desired resonant frequencies. Cross-beams 38 may also introduce a controlled axial compliancy into mount brackets 20(a), 20(b) for enhanced vibrational damping during operation of RWAs 16(a), 16(b).

In certain embodiments, mount brackets 20(a), 20(b) may be produced to include containment structures or "bearing cartridge features," which are integrally formed with central hub portions 36. For example, as indicated in FIGS. 2 and 3 for mount bracket 20(a) (and also applicable to mount bracket 20(b)), mount bracket 20(a) may be produced to include a bearing cartridge feature 44 integrally formed with central hub portion 36. Such an integral bearing cartridge feature 44 may assume the form of a generally tubular wall, which encloses a cylindrical cavity or central bearing compartment 46. One or more spin bearings are matingly received within bearing compartment 46 when RWA 16(a) (FIGS. 1 and 2) is mounted to bracket 20(a). The cylindrical or tubular wall of bearing cartridge feature 44 extends from central hub portion 36 in an axial direction from RWA-support face 18(a); the term "axial direction," as appearing herein, referring to a direction extending parallel to a spin axis of a rotor included within the RWA system (e.g., spin axis of the rotor included in RWA 16(a), as represented by dashed line 48 in FIG. 3). The provision of such integral bearing cartridge feature 44 may advantageously help reduce assembly duration and the overall manufacturing costs of RWA system 10. This notwithstanding, mount bracket 20(a) (and mount bracket 20(b)) need not include an integral bearing cartridge feature in all embodiments of RWA system 10.

One possible RWA construction will now be described with primary reference to RWA 16(b) shown in cross-section on the right of FIG. 3. While focusing on RWA 16(b), specifically, the following description is equally applicable to RWA 16(a), which is identical or substantially identical to RWA 16(b). As shown in FIG. 3, RWA 16(b) includes an RWA rotor 52, which is mounted to hub portion 36 of mount bracket 20(b) for rotation about spin axis 50. The illustrated RWA rotor 52 contains a generally tubular or hollow rotor shaft 54, which is substantially coaxial with central hub portion 36 and bearing cartridge feature 44 of mount bracket 20(b). An annular inertial element or rotor rim 56 is fixedly coupled to rotor shaft 54 through a connective structure 58, which may assume the form of, for example, a disc-shaped suspension web or a spoked structure. RWA 16(b) further contains a generally annular spin motor 60, 62, which includes a motor stator 60 and a motor rotor 62. Motor stator 60 is fixedly mounted to the static structure of mount bracket 20(b) and, specifically, to cross-beams 38. Conversely, motor rotor 62 is affixed to RWA rotor 52 and thus rotates with rotor 52 relative motor stator 60 about spin axis 50. Considered in a radial direction (that is, along an axis perpendicular to spin axis 50), spin motor 60, 62 is located between rotor rim 56 and the tubular sidewall of integral bearing cartridge feature 44. Spin motor 60, 62 is thus largely or wholly nested within RWA rotor 52. Spin motor 60, 62 may be, for example, an ironless armature motor or a brushless Direct Current (DC) motor.

RWA 16(b) further includes control electronics, which are installed on mount bracket 20(b). For example, as indicated in FIG. 3, the control electronics may include or assume the form of a PBA 64, which is affixed to the underside of mount bracket 20(b) substantially opposite spin motor 60, 62. PBA 64 may control the operation of spin motor 60, 62 and include any number of integrated circuits, passive Surface Mount Devices (SMDs), microelectronic modules, and the like suitable for this purpose. As shown most clearly in FIG. 2, PBA 64 may have a generally circular form factor that is substantially conformal with the planform shape of opening 40 provided in RWA-support face 18(b). PBA 64 thus physically contacts a substantial portion of cross-beams 38, spanning at least a majority of the surface area of cross-beams 38 as viewed along spin axis 48. Consequently, when mount bracket 20(b) (and, more generally, multi-faceted bracket structure 14) is fabricated from a material (e.g., an alloy) having a relatively high thermal conductivity, cross-beams 38 may provide relatively robust heat transfer paths for conducting excess heat generated by PBA 64 (and other components included within RWA 16(b)) to main body 26 of bracket structure 14. Main body 26 of bracket structure 14 may then serve as a heat sink or heat spreader. The overall thermal performance of RWA system 10 may be favorably enhanced by providing such efficient dissipation through mount bracket 20(b), as well as through mount bracket 20(b). PBA 64 may have a different planform shapes and/or disposition within RWA system 10 in alternative embodiments.

RWAs 16(a), 16(b) further contain a number of spin bearings. For example, as shown in FIG. 3 for RWA 16(b) (but equally applicable to RWA 16(a)), at least one spin bearing 66 may be included in RWA 16(a), received within integral bearing cartridge feature 44, and positioned around rotor shaft 54. More specifically, spin bearing 66 may pilot to or matingly engage an outer circumferential surface of rotor shaft 54 and an inner circumferential surface of bearing cartridge feature 44. In the illustrated example, spin bearing 66 is a duplex bearing pair containing a number of rolling elements 68 (e.g., balls or rollers) arranged in two annular rows. Rolling elements 68 are captured between an inner ring 70 and a concentric outer ring 72. Furthermore, outer ring 72 is produced to include an annular ledge or step 73 (FIG. 3), which abuts a corresponding annular ledge or step within bearing cartridge feature 44. Inner and outer clamp nuts 74, 76 secure rolling element bearings to rotor shaft 54 and bearing cartridge feature 44, respectively. In particular, inner clamp nut 74 is threaded onto an externally-threaded end portion of rotor shaft 54 and is tightened to exert a preload force across inner ring 70, while outer clamp nut 76 is threaded into an internally-threaded portion of integral bearing cartridge feature 44. Spin bearing 66 thus facilitates low friction rotation of rotor 66 included in RWA 16(b) about spin axis 50 relative to multi-faceted bracket structure 14 and the other static components of RWA system 10.

As noted above, RWAs 16(a), 16(b) are attached to mount brackets 20(a), 20(b) and, more generally, to RWA-support faces 18(a), 18(b) of multi-faceted bracket structure 14. RWA-support faces 18(a), 18(b) are angled with respect to one another and opposed about a midline plane of symmetry. For example, as shown in FIG. 3, the primary or principal planes of RWA-support faces 18(a), 18(b) form an angle $\theta_1$ with respect to one another (identified in FIG. 3 for interior surfaces of bracket structure 14 immediately inboard of faces 18(a), 18(b), but having an identical angular disposition). Angle $\theta_1$ may be equal to or less than 90 degrees [°]. In one embodiment, angle $\theta_1$ is acute. As previously noted, bearing cartridge features 44 of mount brackets 20(a), 20(b) serve as piloting features, which locate the respective spin axes of RWAs 16(a), 16(b) in a precise angular relationship. Thus, when RWAs 16(a), 16(b) are installed on bracket structure 14, multi-faceted bracket structure 14 and, specifically, bearing cartridge features 44 position RWAs 16(a), 16(b) such that spin axes 48, 50 form an angle $\theta_2$ with respect to one another (further identified in FIG. 3). Angle $\theta_2$ may be between about 80° and about 120° in an embodiment. In other embodiments, angle $\theta_2$ may be greater than or less than the aforementioned range. Due, at least in part, to its unique peaked geometry, bi-faceted bracket structure 14 allows angle $\theta_1$ (FIG. 3) to be minimized, while providing the desired angular relationship (angle $\theta_2$ in FIG. 3) between spin axis 48 of RWA 16(a) and spin axis 50 of RWA 16(b). This, in turn, allows the unoccupied volume within internal cavity 28 to be reduced, while the overall mass efficiency of RWA system 10 is increased. Additionally, RWA system 10 may provide relatively broad radiation shielding to protect the electronic components contained within internal cavity 28 (e.g., PBAs 64) when RWA system 10 is deployed onboard a satellite or other spacecraft.

With continued reference to FIGS. 1-3, multi-faceted bracket structure 14 can be fabricated from various different materials. It is generally desirable, however, for multi-faceted bracket structure 14 to be produced from a relatively lightweight, high strength material, such as a composite material or a metallic material (e.g., an aluminum alloy). Concurrently, it may be desirable for multi-faceted bracket structure 14 to be fabricated from a material affording a certain level of damping, as well as a relatively high thermal conductivity to improve heat dissipation from RWAs 16(a), 16(b) through mount brackets 20(a), 20(b). As a still further consideration, bracket structure 14 is ideally produced from a material having a Coefficient of Thermal Expansion (CTE) substantially matched to spin bearings 66 (FIG. 3) in embodiments wherein mount brackets 20(a), 20(b) are produced to include integral bearing cartridge feature 44. In one embodiment, multi-faceted bracket structure 14 may be composed of a beryllium-aluminum (BeAl) alloy, such as a BeAl alloy selected to have a CTE that differs relative to the CTE of spin bearings 66 (FIG. 3) by less than 10%. As appearing herein, the term "beryllium-aluminum alloy," refers to an alloy containing beryllium and aluminum as its primary constituents, by weight percentage, possibly in addition to lesser amounts of other metallic or non-metallic constituents. Similarly, the term "aluminum alloy" refers to an alloy containing aluminum as its primary constituents, by weight.

The foregoing has thus provided a first exemplary embodiment of an RWA system, which contains a multi-faceted bracket structure (e.g., bracket structure 14) to which a number of RWAs (e.g., RWAs 16(a), 16(b)) are mounted. In the above-described exemplary embodiment, the part count, complexity, and weight of RWA system 10 is favorably reduced by adapting mount brackets 20(a), 20(b) of multi-faceted bracket structure 14 to support the various components of RWAs 16(a), 16(b); e.g., the RWA rotor, spin bearing(s), spin motor, PBA (or other control electronics), and the like. As previously described, mount brackets 20(a), 20(b) can be tailored to tune to the dynamic responses of RWAs 16(a), 16(b) through the operational frequency range of the RWA rotors. As a further benefit, mount brackets 20(a), 20(b) may provide enhanced heat dissipation properties for removing excess heat generated by PBAs 64 and other components contained within RWAs 16(a), 16(b). Additionally, in the above-described exemplary embodiment, mount brackets 20(a), 20(b) are produced to include integral bearing cartridge features 44, which retain the RWA spin bearings (e.g., duplex bearing pair 66 of RWA 16(b) shown in FIG. 3) to bring about further reductions in part count, assembly complexity, and overall manufacturing costs. The end result is an RWA system that is not only mass efficient, but that is also relatively compact, provides an increased flexibility in vehicle mounting options, and can be manufactured in a relatively efficient, cost effective manner.

In the exemplary embodiment of FIGS. 1-3, multi-faceted panel structure 14 of RWA system 10 is fabricated as a single piece or monolithic body. Such a monolithic construction may allow the structural integrity of RWA system 10 to be optimized, while reducing part count and assembly costs. In such embodiments, multi-faceted bracket structure 14 can be produced from a near net blank or preform, which is then machined to define the more detailed features of bracket structure 14. Alternatively, multi-faceted bracket structure 14 can be cast, produced utilizing a three dimensional metal printing process, fabricated utilizing powder metallurgy, or produced in another manner. In still further embodiments, multi-faceted bracket structure 14 may be produced from multiple components or modular parts, which can be joined by bonding, by welding, utilizing fasteners or other hardware, by threaded interface, by thermal fit, or in various other manners. For example, in certain implementations, multi-faceted bracket structure 14 may be fabricated from two interchangeable panels, which are joined in a back-to-back relationship about a midline plane of symmetry. An example of such an embodiment will now be described below in conjunction with FIGS. 4 and 5.

Figure 4:
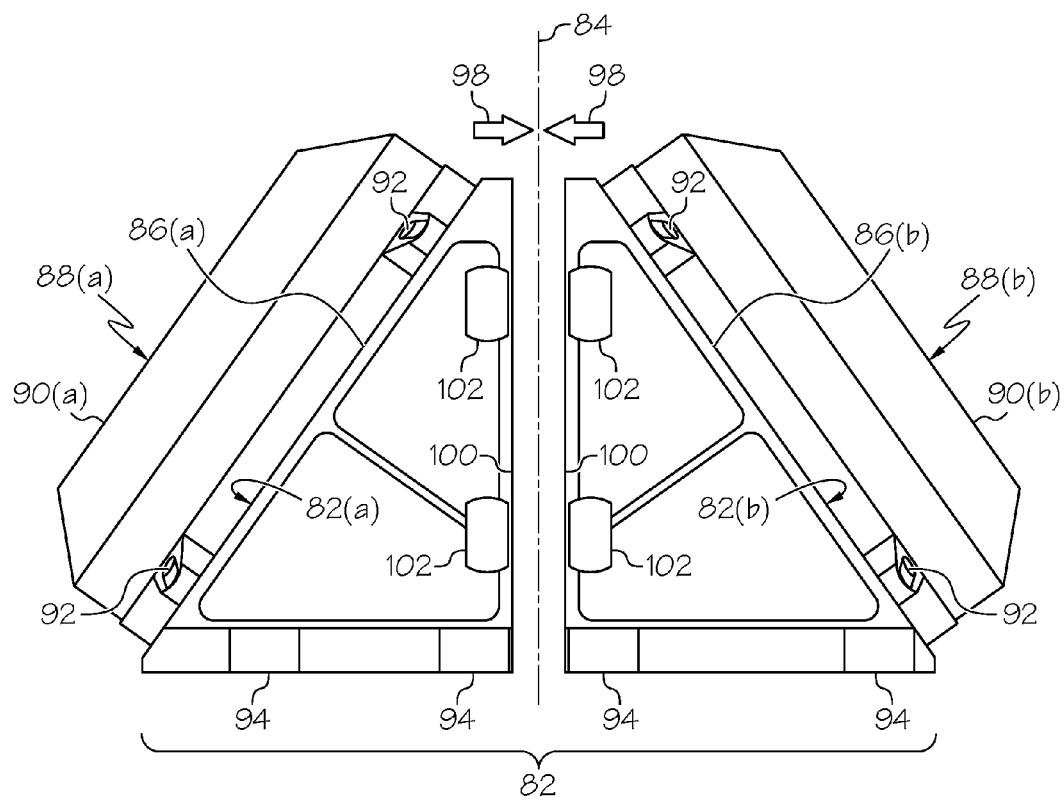
FIG. 4 is a side view of an RWA system including a bi-faceted bracket structure, which is assembled from two interchangeable panels, as illustrated in accordance with a further exemplary embodiment of the present disclosure.
Figure 5:
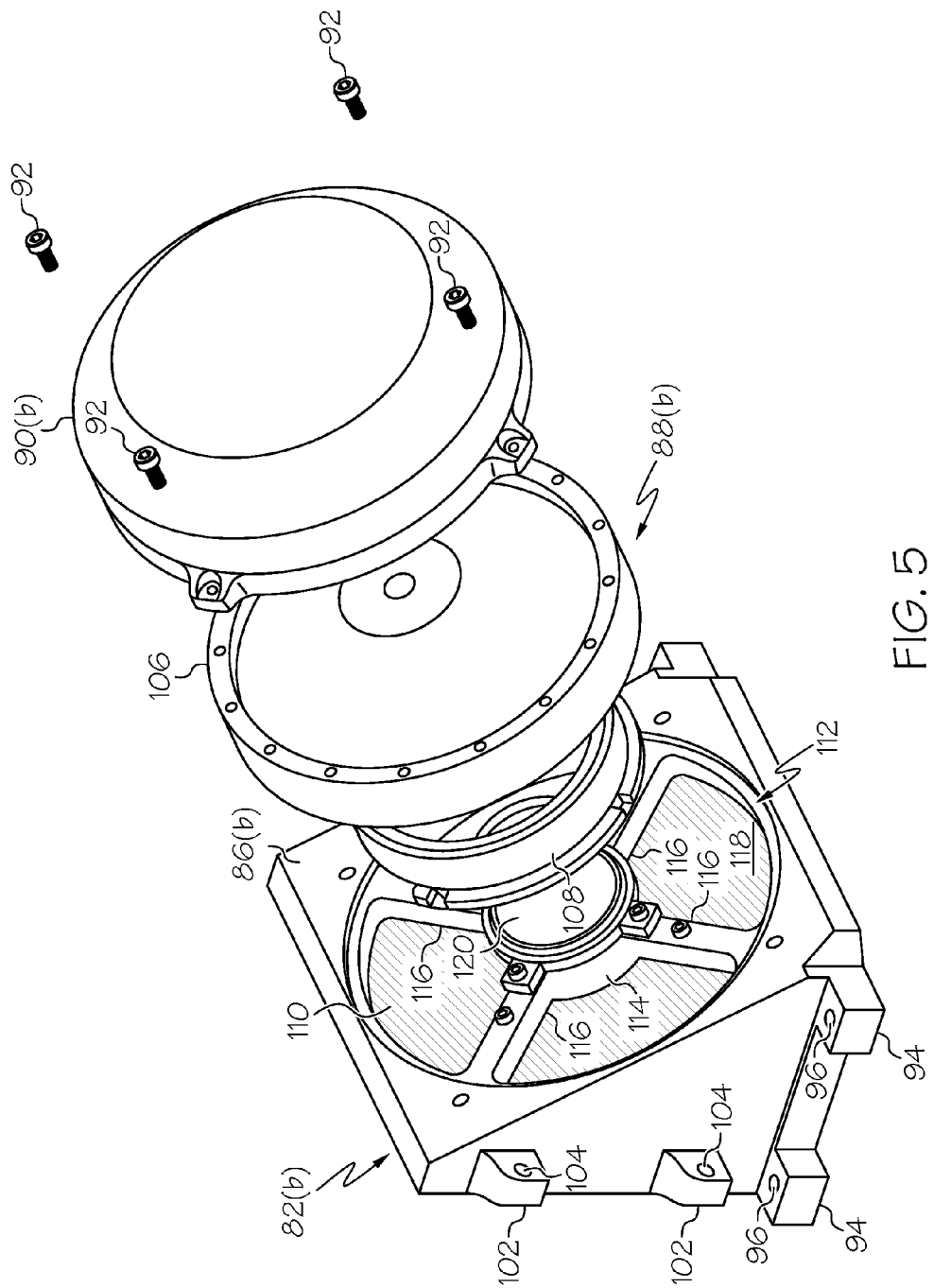
FIG. 5 is an isometric view illustrating an interchangeable panel included in the bi-faceted bracket structure of FIG. 4 and further illustrating, in a partially exploded state, an RWA mounted to the interchangeable panel.

FIG. 4 is a partially-exploded side view of an RWA system 80, as illustrated in accordance with a further exemplary embodiment of the present disclosure. As may be appreciated by comparing FIG. 1 to FIG. 4, RWA system 80 is similar to RWA system 10 (FIGS. 1-3) in may respects. For example, as does RWA system 10, RWA system 80 includes a bi-faceted bracket structure 82 having a centerline 84 and two angled RWA-support faces 86(a), 86(b), which are opposed about a midline plane of symmetry containing centerline 84 and extending orthogonal to the plane of the page in FIG. 4. Two RWAs 88(a), 88(b) are mounted RWA-support faces 86(a), 86(b), respectively, in a similar opposing relationship. RWAs 88(a), 88(b) are enclosed by rotor covers 90(a), 90(b), which are further mounted to RWA-support faces 86(a), 86(b) utilizing bolts 92. Bi-faceted bracket structure 82 further includes a vehicle mount interface 94, which is oriented substantially orthogonal to centerline 84 and which extends around a lower periphery of bi-faceted bracket structure 82. As was previously the case, vehicle mount interface 94 assumes the form of a plurality of tabs through which fastener openings 96 (FIG. 5) are provided to facilitate attachment of RWA system 80 to a satellite or other platform.

In contrast to bi-faceted bracket structure 14 of RWA system 10 (FIGS. 1-3), bi-faceted bracket structure 82 of RWA system 80 (FIG. 4) is produced from two bracket structure components or parts 82(a), 82(b). Bracket structure parts 82(a), 82(b) are substantially identical and freely interchangeable or "swappable" and are thus referred to hereafter as "interchangeable panels 82(a), 82(b)." Interchangeable panels 82(a), 82(b) are position in a back-to-back relationship, as taken about centerline 84, when bi-faceted bracket structure 82 is assembled. For clarity of illustration, a slight gap is shown between interchangeable panels 82(a), 82(b) in FIG. 4; however, as further indicated by arrows 98, interchangeable panels 82(a), 82(b) are placed in mating contact alongside their respective backside surfaces 100 when RWA system 10 is fully assembled; the term "backside," as appearing herein, defined as the principal panel surface or surfaces of a given interchangeable panel (e.g., panel 82(a) or panel 82(b)) substantially opposite the RWA-support face thereof. In the illustrated example, backside surfaces 100 abut along a substantially planar interface, which is also represented by dashed line 84 in FIG. 4.

Interchangeable panels 82(a), 82(b) further include corresponding interconnect features, which align when bi-faceted bracket structure 82 is assembled to position panels 82(a), 82(b) with respect to one another. As shown in FIG. 4, and as further shown in FIG. 5 (an exploded view of interchangeable panel 82(b) and its corresponding RWA 88(b)), the interconnect features may include a plurality of coupler tabs 102 provided at selected locations along a periphery of backside surfaces 100 of panels 82(a), 82(b). Coupler tabs 102 include fastener openings 104 therein (identified in FIG. 5), which align when interchangeable panels 82(a), 82(b) are properly positioned to accept bolts or other fasteners. Coupler tabs 102 thus ensure proper alignment between interchangeable panels 82(a), 82(b) when assembled into bi-faceted bracket structure 82. More generally, bi-faceted bracket structure 82 may precisely set the desired spatial relationship between the respective spin axes of RWAs 88(a), 88(b). At the same time, the modular or panelized design of bi-faceted bracket structure 14 allows flexibility in repair and replacement of either of the RWA modules; that is, the replacement of interchangeable panel 82(a) and RWA 88(a) or the replacement of interchangeable panel 82(b) and RWA 88(b). In further embodiments, coupler tabs 102 can be replaced by a different type of interconnect feature, such as a plurality of clamp or latch features.

In addition to having a modular or panelized construction, RWA system 80 (FIG. 4) differs from RWA system 10 (FIGS. 1-3) in another manner, as well. This difference may be appreciated by referring to FIG. 5, which is a partially exploded view of RWA module 82(b), 88(b) (the term "RWA module" referring to the assembled combination of interchangeable panel 82(b) and RWA 88(b)). RWA module 82(b), 88(b) is substantially identical to RWA module 82(a), 88(a); thus, the following description is equally applicable thereto. RWA 88(b) is shown in an exploded view and includes a rotor 106, a spin motor 108, and a PBA 110. As can further be seen in FIG. 5, interchangeable panel 82(a) includes a mount bracket 112, which is formed in RWA-support face 86(a) and which supports the various components of RWA 88(b). Mount bracket 112 includes a central hub portion 114, which is concentrically located within an opening 118 provided in RWA-support face 86(b) and suspended therein by a plurality of cross-beams 116.

A bearing cartridge feature 120 fixedly coupled to central hub portion 114 and contains one or more spin bearings; e.g., a non-illustrated bearing pair substantially identical to duplex spin bearing 66 shown in FIG. 3. However, in this embodiment, bearing cartridge feature 120 is not integrally formed with central hub portion 114. Instead, bearing cartridge feature 120 is separately produced as a discrete piece, which is bolted to or otherwise affixed to central hub portion 114. Such a multipart construction permits bearing cartridge feature 120 and interchangeable panel 82(a) to be fabricated from different materials, albeit with the tradeoff of increased part count. In one embodiment, interchangeable panel 82(a) is produced from a first metallic material (e.g., an aluminum alloy or BeAl alloy) having a first density, while bearing cartridge feature 120 is produced from a second material (e.g., a steel) having a second density greater than the first density.

There has thus been provided a second exemplary embodiment of an RWA system including a multi-faceted bracket structure and a plurality of RWAs, which are mounted to the bracket structure. In the exemplary embodiment of FIGS. 4 and 5, the RWA system contained a bi-faceted, peaked bracket structure, which was assembled (at least in substantial part) from two modular, interchangeable panels joined in a back-to-back relationship. In further embodiments of the RWA system, the interchangeable panels can be assembled to yield a multi-faceted bracket structure having a different form factor and additional RWA-support faces. For example, in further embodiments, the RWA system may include a multi-faceted bracket structure assembled from three or four interchangeable panels and having a generally pyramidal form factor. In such embodiments, the multi-faceted bracket structure may have three to four RWA-support faces or angled sides, which support an equivalent number of RWAs. A further exemplary embodiment of an RWA system including such a panelized multi-faceted bracket structure will now be described in conjunction with FIGS. 6-8.

Figure 6:
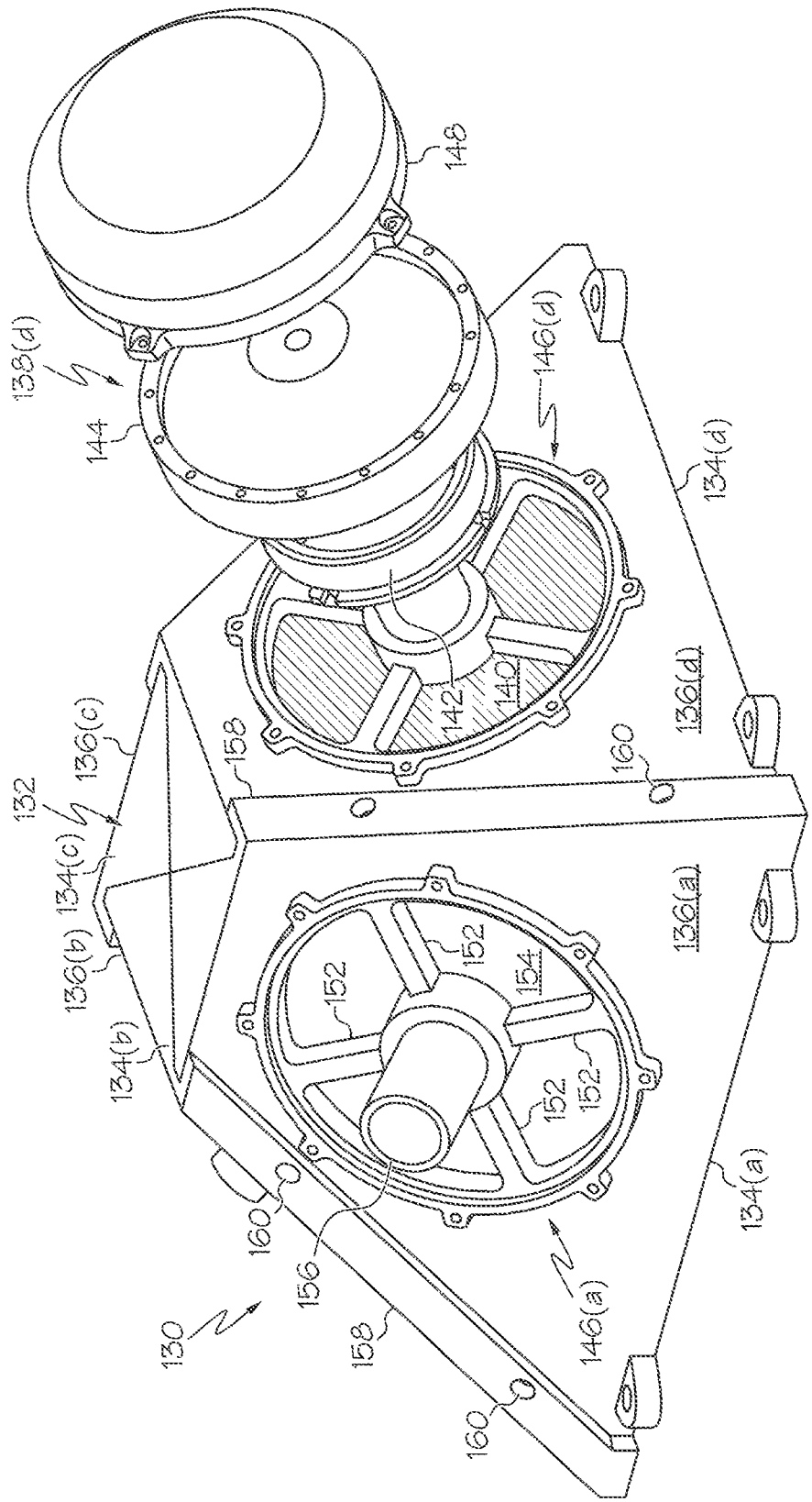
FIGS. 6 and 7 are isometric views of an RWA system shown in partially assembled and fully assembled states, respectively, and including a multi-faceted bracket structure having pyramidal form factor and assembled from four interchangeable panels, as illustrated in accordance with a still further exemplary embodiment of the present disclosure.
Figure 7:
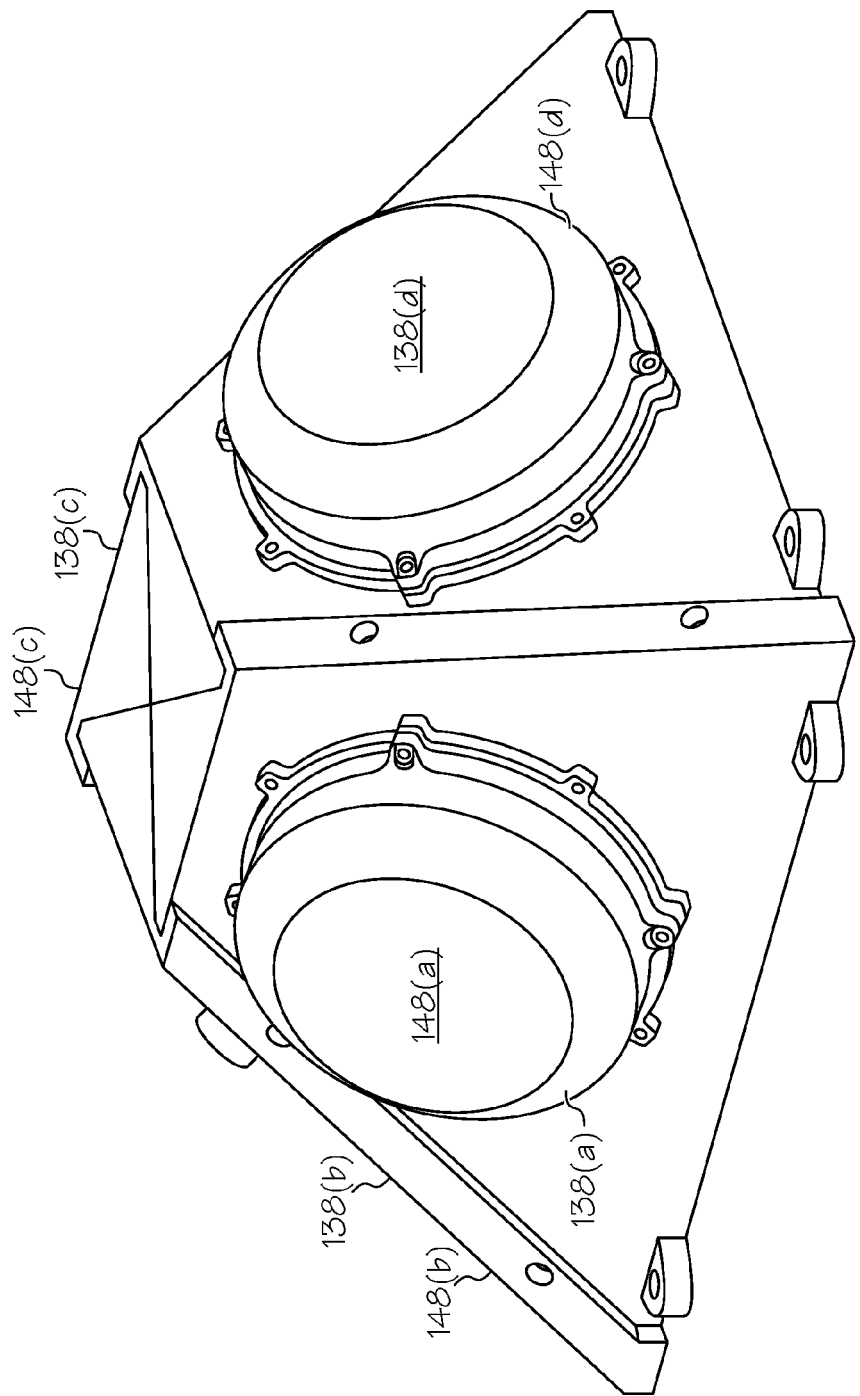

FIGS. 6 and 7 are isometric views of an RWA system 130 as shown in partially assembled and fully assembled states, respectively, and illustrated in accordance with a further exemplary embodiment of the present disclosure. As does RWA system 80 described above in conjunction with FIGS. 4 and 5, RWA system 130 includes a multi-faceted bracket structure 132 assembled from a plurality of interchangeable panels 134, which each define an angled RWA-support face 136. However, in the case of RWA system 130, multi-faceted bracket structures 132 is assembled from four interchangeable panels 134(*a*)-(*d*) and includes four RWA-support faces 136(*a*)-(*d*) (two of which can be fully seen in FIGS. 6 and 7). As indicated in FIG. 7, multiple RWAs 138(*a*)-(*d*) are installed within RWA system 80, with each RWAs 138(*a*)-(*d*) mounted to a different RWA-support face 136(*a*)-(*d*). RWA 138(*d*), specifically, is shown in a partially exploded state in FIG. 6. As can be seen, RWAs 138(*a*)-(*d*) includes a PBA 140, a spin motor 142, and a rotor 144. RWAs 138(*a*)-(*c*) are substantially identical to RWA 138(*d*) and thus contain equivalent components. RWAs 138(*a*)-(*d*) are enclosed by rotor covers 148(*a*)-(*d*), respectively, which are bolted to or otherwise affixed to RWA-support faces 136(*a*)-(*d*) in the manner generally shown in FIG. 7.

Figure 8:
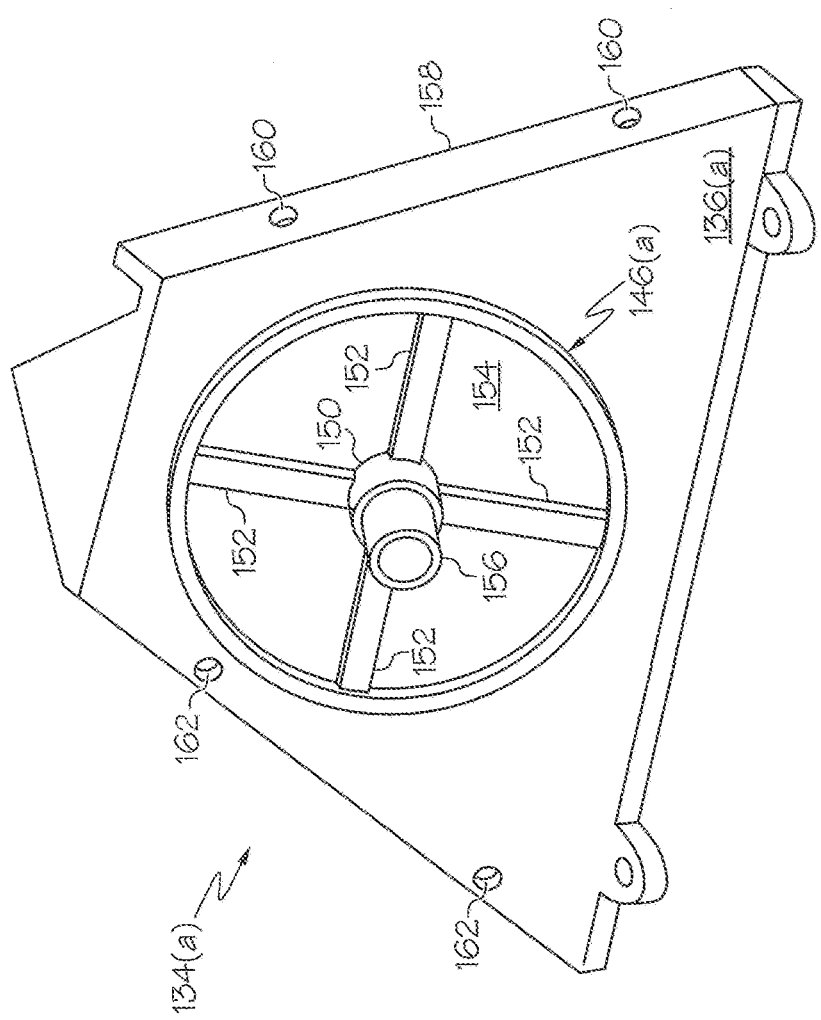
FIG. 8 is a more detailed isometric view an interchangeable panel included in the multi-faceted bracket structure of the exemplary RWA system shown in FIGS. 6 and 7.

FIG. 8 illustrates interchangeable panel 134(*a*) in isolation and is further illustrative, by extension, of interchangeable panels 134(*b*)-(*d*), which are substantially identical to panel 134(*a*). Referring collectively to FIGS. 6-8, each interchangeable panel 134 includes a mount bracket 146, which is substantially identical to mount brackets 20(*a*), 20(*b*) shown in FIGS. 2 and 3. For example, as shown in FIGS. 6 and 8 for interchangeable panel 134(*a*), a mount bracket 146(*a*) is formed in RWA-support face 136(*a*) along with a central opening 154. Mount bracket 146(*a*) includes a central hub portion 150 and a plurality of tie bars or cross-beams 152, which extend from the circumferential edge defining opening 154 to central hub portion 150 to suspend hub portion 150 within opening 154. Once again, central hub portion 150 of mount bracket 146(*a*) is produced to include an integral bearing cartridge feature 156, which assumes the form of a generally tubular structure containing a central bearing compartment in which the RWA spin bearing(s) are received.

Interchangeable panels 134(*a*)-(*d*) include interconnect features, which mate or register to position panels 134(*a*)-(*d*) (and, therefore, the respective spin axes of RWA 138(*a*)-(*d*)) in a precise angular relationship when multi-faceted bracket structures 132 is assembled. In the exemplary embodiment of FIGS. 6-8, the interconnect features include a plurality of flanges 158 having fastener openings 160 therein. Flanges 158 are formed along selected sidewall edge portions of interchangeable panels 134(*a*)-(*d*) and wrap partially around RWA-support faces 136(*a*)-(*d*) when the multi-faceted bracket structure 132 is assembled to position panels 134(*a*)-(*d*) in a predetermined angular relationship. Additionally, fastener openings 160 align with corresponding fastener openings 162 provided along an edge portion of each RWA-support face 136(*a*)-(*d*) (shown in FIG. 8 for panel 134(*a*). Bolts or other fasteners can thus be inserted into the aligning pairs of openings 160, 162 to secure interchangeable panels 134(*a*)-(*d*) in their desired spatial positions.

There has thus been provided multiple exemplary embodiments of an RWA system including a multi-faceted bracket structure. In certain embodiments, the multi-faceted bracket structure has a modular construction and is assembled from multiple interchangeable panels. By virtue of such a modular, interchangeable construction, maintenance the RWA system can be eased. The modular panels may have mating or interlocking structure features, which precisely set the orientation of the panels when assembled and, therefore, the relatively orientation of the RWA spin axes. This ensures the optimal positioning of the RWAs, while reducing assembly requirements. In certain implementations of the RWA system, the modular panels can be assembled into a multi-faceted bracket structure having three to four faces or sides and a generally pyramidal form factor. In other implementations, the RWA system may instated contain a bi-faceted bracket structure, which is assembled from two modular panels joined in a back-to-back relationship. In such implementations, RWA mass efficiency is optimized by minimizing the volume of unoccupied space within the multi-faceted bracket structure relative to the overall system envelope. Additionally, such a peaked RWA system may provide improved radiation shielding of control electronics housed within the bracket structure. In further embodiments, the RWA system can be produced to include a bi-faceted bracket structure, which is fabricated as a single or monolithic piece for increased structural robustness.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set forth in the appended Claims.

What is claimed is:

1. A Reaction Wheel Assembly (RWA) system, comprising:
    a multi-faceted bracket structure having a centerline, RWA-support faces angularly spaced about the centerline, and a vehicle mount interface substantially orthogonal to the centerline; and a plurality of RWAs mounted to the RWA-support faces of the multi-faceted bracket structure;

wherein the multi-faceted bracket structure is assembled from multiple interchangeable panels, each defining one of the RWA-support faces and a portion of the vehicle mount interface, and wherein the multiple interchangeable panels comprise a plurality of flanges formed along selected edge portions of the multiple interchangeable panels and wrapping partially around the RWA-support faces to position the multiple interchangeable panels in a predetermined angular relationship when the multi-faceted bracket structure is assembled.

2. The RWA system of claim 1 wherein each of the multiple interchangeable panels is produced as a monolithic structure composed, at least in part, of a beryllium aluminum alloy.

3. The RWA system of claim 1 wherein the multiple interchangeable panels comprise:
   a first interchangeable panel; and
   a second interchangeable panel positioned in an opposing, back-to-back relationship with the first interchangeable panel, as taken along a midline plane containing the centerline.

4. The RWA system of claim 3 wherein the RWA-support faces comprise:
   a first RWA-support face defined by the first interchangeable panel; and
   a second RWA-support face defined by the second interchangeable panel and forming an acute angle θ with the first RWA-support face.

5. The RWA system of claim 1 wherein the multiple interchangeable panels comprise mount brackets formed in the RWA-support faces, and wherein the plurality of RWAs comprises a plurality of rotors mounted to the mount brackets for rotation about a plurality of spin axes.

6. The RWA system of claim 5 wherein the plurality of RWAs comprises a plurality of spin bearings, and wherein the plurality of mount brackets comprises a plurality of integral bearing cartridge features housing the plurality of spin bearings.

7. A Reaction Wheel Assembly (RWA) system, comprising:
   a multi-faceted bracket structure, comprising:
      a first interchangeable panel including a first mount bracket;
      a second interchangeable panel fixedly joined to the first interchangeable panel and including a second mount bracket; and
      a vehicle mount interface at least partially defined by the first and second interchangeable panels; and
   first and second RWAs mounted to the first and second mount brackets, respectively,
   wherein the first interchangeable panel comprises an RWA-support face in which an opening is formed, and wherein the first mount bracket comprises:
      a plurality of cross-beams extending within the opening; and
      a central hub portion integrally formed with the plurality of cross-beams and substantially concentrically located within the opening.

8. The RWA system of claim 7 wherein the first RWA comprises:
   a spin motor having a motor stator fixedly coupled to the first mount bracket;
   a rotor rotatably coupled to the first mount bracket; and
   control electronics fixedly coupled to the first mount bracket substantially opposite the spin motor.

9. The RWA system of claim 7 wherein the first RWA includes a spin bearing, and wherein the first mount bracket comprises a bearing cartridge feature containing the spin bearing and integrally formed within the central hub portion.

10. The RWA system of claim 7 wherein the first and second interchangeable panels are positioned in an opposing, back-to-back relationship.

11. The RWA system of claim 7 further comprising:
    a third interchangeable panel including a third mount bracket; and
    a third RWA mounted to the third interchangeable panel;
    wherein the multi-faceted bracket structure has a generally pyramidal form factor including at least three RWA-support faces defined by the first, second, and third interchangeable panels.

12. The RWA system of claim 11 further comprising interlocking features fixedly coupled to the first, second, and third interchangeable panels and locating the first, second, and third interchangeable panels in a predetermined spatial relationship when the RWA system is assembled.

13. A Reaction Wheel Assembly (RWA) system, comprising:
    a multi-faceted bracket structure having a centerline, the multi-faceted bracket structure comprising:
       a first bracket structure portion defining a first mount bracket; and
       a second bracket structure portion defining a second mount bracket, the first and second bracket structure portions opposed about a midline plane containing the centerline, and
    first and second RWAs attached to the first and second mount brackets, respectively,
    wherein the first and second mount brackets each comprise:
       a body having an inner circumferential edge defining an opening;
       a cartridge hub feature positioned within the opening; and
       a plurality of cross-beams extending from the inner circumferential edge to the cartridge hub.

14. The RWA system of claim 13 wherein the first and second bracket structure portions are integrally formed as a single piece.

15. The RWA system of claim 13 wherein the first and second bracket structure portions are discrete pieces, which are positioned in a back-to-back relationship relative to the midline plane.

16. The RWA system of claim 13 wherein the first and second RWAs comprise first and second spin bearings, respectively; and
    wherein the first and second brackets comprise first and second bearing cartridge features, respectively, in which the first and second spin bearings are matingly received.

* * * * *